3,342,238
SYNTHETIC RUBBER TIRE AND ADHESIVE
THEREFOR
Kermit V. Weinstock, Silver Lake, and Emert S. Pfau, Cuyahoga Falls, Ohio, assignors to The General Tire & Rubber Company, Akron, Ohio, a corporation of Ohio
No Drawing. Filed May 8, 1962, Ser. No. 193,304
14 Claims. (Cl. 152—330)

The present invention is a continuation-in-part of copending application Ser. No. 489,262, filed February 18, 1955, in the names of Kermit V. Weinstock and Emert S. Pfau, now abandoned, and relates to pneumatic rubber tires employing certain improved synthetic rubber adhesives and cements therein and more particularly to butadiene-styrene rubbery polymers and oil-extended synthetic rubber tires containing such adhesives and to methods of making tires thereby.

The present invention is particularly concerned with synthetic rubber cements which are used in the making of tires by the "flat-band" process. Such cements may be applied at the tread splice or to the several plies of the tire carcass or may be applied as a thin layer between the tread portion of a tire and the carcass thereof. Since the tread portion of the unvulcanized tire may be required to stretch a considerable amount, for example as much as about 50 percent, when expanded from a substantially cylindrical to a toroidal shape, the tread cement must have a high film strength to avoid rupture during such expansion. Natural rubber cements are satisfactory in this respect but are not preferred for synthetic rubber tires especially where such tires contain oil or other ingredients which are not compatible with natural rubber.

In order to obtain a cement having satisfactory film strength, where the tires are made by the "flat-band" process, a polymer should be employed which in the raw and unvulcanized state has a high-Mooney plasticity as will be more fully described hereinafter. With a cement made from such a polymer it is usually necessary to employ at least about 5 or 10 parts of plasticizer per 100 parts of polymer to obtain the desired pressure sensitivity. The amount of resin employed with such high-Mooney polymers is usually about 20 to 80, preferably 30 to 60, parts per 100 parts by weight of polymer. The cement should also contain substantial amounts of carbon black to provide the adhesive layers with the desired physical characteristics. The carbon black and other ingredients may, for example, provide the vulcanized cement layer with physical characteristics not greatly different from those of the rubber compound to which it is adhered. The amount of carbon black used in the cement is about 40 to 90 parts, preferably 50 to 70 parts per 100 parts by weight of rubbery polymer. The amount of oil should be less than the amount of resin so that it will not substantially reduce the film strength of the cement. It is usually preferable to employ an amount of oil or other softener less than about one-half the amount of resin.

The synthetic rubbers to which the present invention relates are polymers of conjugated diolefinic compounds such as butadiene, isoprene, dimethylbutadiene, and the like having not in excess of and preferably less than eight carbon atoms. Copolymers of one or more diolefinic compounds such as those aforementioned may be employed with one or more copolymerizable mono-olefines, such for example as the arylolefinic compounds such as alphamethylstyrene, 3,4-dichloro-alpha-methylstyrene, p-acetyl-alphamethylstyrene, and including the arylvinyl compounds such as styrene and halogenated and nuclearly methylated styrenes such as 2,5- or 3,4-dichlorostyrene, 3,4-dimethylstyrene, 3-chloro 4-methylstyrene and the like.

We have found that the so-called "cold rubbers" are preferable for making the cement compound of the present invention and for making the tires in which the cement compound is used. Such cold rubbers should have a very high Mooney viscosity.

The present invention is particularly concerned with GR–S rubbers and the like which are now being used to a large extent in the manufacture of tires. The term "GR–S" is used herein as in the parent application to describe butadiene-styrene copolymers although such term has been superseded by the equivalent term "SBR". In the copolymers with which this invention is concerned, the total proportion of butadiene and/or other conjugated diolefinic compounds is ordinarily at least 50% of the weight of the copolymer. The invention is especially concerned with copolymers containing styrene as will hereinafter be described.

As is well known in the art, the toughness and plasticity of a raw unvulcanized rubber compound may be determined by means of a standard Mooney plastometer. However, proper characterization of a given polymeric material may not always be made directly by means of a Mooney plastometer reading on the raw polymer as gel content, gel distribution, and molecular weight affect the polymer and are not indicated by a Mooney plastometer. The term "computed Mooney" has, therefore, been employed herein, the meaning of this term being explained in more detail in U.S. Patent No. 2,964,083.

While gel-containing synthetic rubbers may be used in making the cement compound of the present invention, it is preferable to use rubbers which are substantially gel-free since it is difficult to dissolve the gel in a rubber compound; however, by mastication and/or other procedures gel-containing rubbers can be broken down so that they may be dissolved in a suitable solvent such as benzene. It is preferable in the making of a cement solution to employ rubber mixtures which may be dissolved in non-toxic organic solvents such as, for example, naphtha or gasoline without the use of aromatic solvents such as benzene.

Accordingly, the present invention provides a practical method of dissolving high-Mooney rubbers without the required addition of aromatic solvents. By adding suitable resins, as will be hereinafter described, to a substantially gel-free butadiene-styrene coplymer that will not dissolve readily in an aromatic solvent such as benzene, it is possible to dissolve the resulting mixture in an aliphatic solvent such as naphtha or gasoline.

A large amount of a suitable resinous tackifier is employed in the adhesive composition of this invention. Such resin tackifier is soluble in or compatible with the rubbery polymer in the cement, or in other words a resin which is capable of being milled into the polymer and vulcanized to form a homogeneous rubber material. It will be understood that a resinous material or tackifier which bleeds out of the rubber or normally forms a heterogeneous material upon vulcanization is incompatible with the rubber in the cement and is unsuitable for the purposes of the present invention.

Resins suitable for the cement of the present invention have a substituted ring structure and are, therefore, aromatic in nature. Such resins are soluble in benzene and, several of these resins due to their aromatic nature, may have a synergistic effect tending to facilitate dissolving of the cement in aliphatic solvents. Most of the vulcanizable rubber-compatible resins normally used as tackifiers in the compounding of rubber tire compounds may be used in the cement of the present invention. Such resins may be, for example, indene resins, rosins, coumarone resins, oil-soluble phenolic resins, coumarone-indene resins, various other resins which are compatible with rubber, or mixtures of the above resins. Best results are usually obtained where the resins used in the cement have a melting point above 160° F. and are readily soluble in pure benzene.

Where one part by weight of the resin used in the cement of the present invention is mixed with five parts by weight of pure benzene, at least 80 percent and preferably at least about 90 percent of the resin should dissolve when the mixture is at room temperature or 70° F., although this is not indispensable for the purposes of the invention. However, the cement mixture is superior where at least 90 percent thereof dissolves in pure hexane at 70° F. when one part of the mixture is added to 10 parts of said hexane, and best results are obtained where at least 90 percent dissolves when one part of the mixture is added to five parts or less of pure hexane at 70° F., whereby the cement may readily be dissolved in naphtha or gasoline.

It will be understood that the tackifying resin used in the rubber cement of the present invention should, when mixed with the high-Mooney polymer and with the other ingredients of the cement, provide a vulcanizable cement compound which when applied between two unvulcanized pieces of regular GR–S or oil-extended GR–S rubber tire compounds that are pressed tightly together will hold said pieces together and will strongly resist separation of said pieces of rubber. The resin to be suitable for the cement must be capable of substantially increasing the tackiness of the polymer and of the cement mixture so as to provide a cement compound suitable for use in making high quality pneumatic tires. However, it will be understood that a resin which is a tackifier for the cement is not necessarily sticky to the touch when compounded and will not necessarily impart sufficient surface tack to render unnecessary the addition of an oily softener and/or natural rubber to the cement to obtain the needed tack.

It will also be understood that various plasticizers which soften a cement mixture and may or may not impart a certain amount of pressure sensitivity and surface tack thereto cannot be considered as being tackifiers like the resins used in the cement of the present invention since they alone do not impart to the rubber mixture a substantially increased tendency to adhere to other pieces of rubber. Also hydrocarbon mineral oil softeners or plasticizers, such as Sundex 53 or the like, when added to high-Mooney polymers do not by themselves impart tackiness to the cement and cannot be considered as being tackifiers as that term is used in the present specification and the appended claims. In fact such oily softeners heretofore were not generally used in cements since they were not believed to be suitable where tackiness was required. It will also be understood that in the appended claims, natural rubber (*Hevea brasiliensis*) cannot be considered a tackifying resin even though it inherently has the tackiness suitable for use in a cement and even though it may be added to the cement of the present invention.

Various natural and synthetic resins are available commercially which may be used in the cement of the present invention, and it will be apparent that other resins not in large scale production which are compatible with the high-Mooney polymer of the cement may also be used to advantage as a tackifier in such cement. The resin may, for example, be a natural wood rosin, a hydrogenated rosin such as "Staybelite Resin" or various compatible rosin derivatives. Excellent results may, for example, be obtained using "Cumar MH 2½" (polymers of indene, coumarone and associated coal tar compounds) "Picco 100" (a para coumarone-indene resin), or other coumarone-indene resins. The resin may be a condensation product of an aliphatic substituted aromatic hydroxyl compound with acetylene or a low molecular weight aliphatic aldehyde having no more than five carbon atoms, such as propionaldehyde, butyraldehyde or crotonaldehyde. Where a practical low cost resin is sought, natural wood rosin would be an excellent choice.

There are numerous phenolic derivatives which would be soluble in or compatible with the polymer of the cement and would be excellent for the cement of the present invention. The phenolic resins which have a substituted ring structure, are soluble in benzene, and have melting points within the desired range are excellent for use in the cement. Because of the large number of different phenolic resins suitable for the cement of the present invention, only a few of the preferred types are specifically described herein. However, it will be understood that, of the tackifying resins, most of the so-called oil-soluble phenolic resins and oil-soluble modified phenolic resins which are soluble in benzene are compatible with the polymer and are suitable for the cement of the present invention.

In order to obtain a resin which has the desired compatibility with a high-Mooney GR–S copolymer so as to be suitable for use in the cement of the present invention, the resin may be modified in various ways with certain modifying agents used in synthetic resin manufacture. A phenolic resin may, for example, be modified with styrene or with the esterification products of glycerol and natural rosin (ester gum) so as to obtain a resin with the desired solubility. Such procedures give the so-called oil-soluble phenol resins which should be distinguished from the oil-soluble 100% phenol resins. In the preparation of the latter group, substituted phenols are employed such as p-tertiary butylphenol, p-phenylphenol, octylphenol, and the like. In general the aryl- and alkyl-substituted phenols yield resins which are markedly more soluble in benzene than those prepared from the simpler phenols, and those phenols which are substituted in the ortho or para position with an aryl or alkyl group having at least three carbon atoms generally provide resins which are superior.

Various tackifying resins made from phenol ($C_6H_5OH$) may be used in the rubber cement of the present invention if they are modified so as to be compatible with the rubbery copolymer used in the cement. Such modification provides a softer and less brittle resin having less heat distortion and more impact strength. Various condensation products of phenol and low molecular weight aliphatic aldehydes of not more than five carbon atoms are suitable resins for the rubber cement, but the phenol-formaldehyde and phenol-acetaldehyde resins are the most important of these. Each of these resins is made by reacting less than one mol of an aldehyde with each mol of phenol. One of the many commercial resins suitable for the cement is "Durez 13355" (a novolak-type water-insoluble phenol-formaldehyde condensation product curable in hexamethylene tetramine) which is made by reacting about 1.8 mols of phenol with each mol of formaldehyde. Another of said commercial resins which is suitable is "Synvar RC 16H" (a novolak-type condensation product of phenol and formaldehyde, which product is modified with styrene so as to be soluble in hydrocarbon mineral oils as well as in pure benzene and so as to be highly compatible with high-Mooney GR–S rubber and the like). The above Synvar resin is advantageously mixed with a curing agent such as hexamethylene tetramine (hexamine) so as to be curable in the cement, but it will be understood that a suitable curing agent for the resin, such as hexaethylene tetramine, may be added as a separate ingredient to the cement. The resin may, for example, be "Synvar RC 16" which is the same as the first-mentioned Synvar resin but does not contain added hexamethylene tetramine. The Durez resin has properties similar to those of the Synvar resins and may be cured in a similar manner.

In order to make resins from phenol which are more highly compatible with the rubber, a hydrocarbon substituted phenol, for example, may be used to replace part of the simple phenol. Such substituted phenol may, for example, be paratertiary butylphenol, ortho-tertiary amylphenol, or other amyl phenols, para-propylphenol, paraisopropyl phenol, 3,5-dipropylphenol, para-phenylphenol, octylphenol, para-hexylphenol, 3,5-diethylphenol, or the like and is preferably substituted in one of the ortho and para positions with an aryl or alkyl group having at least three carbon atoms, although good results may be obtained with a phenol (such as Cardanol or the like) substituted in one or both of the meta positions with an alkyl radical having more than four carbon atoms up to about fifteen carbon atoms.

Resins suitable for the cement of the present invention may be condensation products of an aliphatic aldehyde of no more than five carbon atoms and a mixture of phenol and an aryl- or alkyl-substituted phenol. In making such condensation products, the number of mols of the simple and the substituted phenols in the mixture of phenols is preferably greater than the number of mols of the aldehyde reacted with said mixture to form the resin.

A suitable resin also may be made from an aldehyde, such as formaldehyde or acetaldehyde, together with a mixture of phenol and "Cardanol" (the monohydric phenol fraction of cashew nut shell oil in which the phenol is substituted in one of the meta positions with an unsaturated aliphatic hydrocarbon group having 15 carbon atoms).

Other resins suitable for the cement of the present invention may be condensation products of acetylene or an aliphatic aldehyde, such as formaldehyde or acetaldehyde, and an aromatic hydroxyl compound such as a phenol substituted in one of the ortho and para positions with an aryl or alkyl radical having about three carbon atoms. A suitable resin could be made by reacting with acetaldehyde a molar excess of a phenol substituted in one of the ortho and para positions with an aryl or alkyl group having three or more carbon atoms.

The rubber-compatible tackifying resins suitable for the cement of the present invention are normally insoluble in water and preferably soluble in hydrocarbon mineral oils and, when mixed with the high-Mooney rubbery copolymer and the carbon black or other reinforcing material, provide a reinforced cement compound which may be readily vulcanized in a tire. The phenolic tackifying resins are advantageously curable in the presence of a curing agent, for example, hexamethylene tetramine, so that they may be cured with the cement when the synthetic tire containing such cement is vulcanized. The resins in the cement preferably are capable of being cured at substantially the same moderate rate as the other portions of the tire so that conventional vulcanization methods may be used to obtain high quality tires.

Part of the tackifying resins used in the cement may be a modified rosin such as a modified pentaerythritol ester of rosin.

In making the cement of the present invention, 100 parts by weight of a rubbery polymerization product of a conjugated diolefinic compound of not in excess of eight aliphatic carbon atoms, that is preferably compatible with hydrocarbon mineral oils and that has a computed Mooney plasticity in the raw and unvulcanized state of about 120 to 200, is mixed with about 20 to 80 parts by weight, preferably about 30 to 60 parts by weight, of a compatible tackifying resin or resinous material.

In the cement of the present invention it is preferred to add a suitable softener or plasticizer. The plasticizer should be compatible with the synthetic rubber or polymer of the cement, and various compatible plasticizers may be used including extremely low molecular weight diolefins such as liquid polybutadiene or the like. Liquid or oily plasticizers are generally preferred, and liquid plasticizers with a low pour point are ordinarily much superior for low temperature rubbers. In the case of synthetic rubbers made from butadiene or other conjugated diolefin and styrene (and for hydrocarbon rubbers generally) the plasticizer is preferably a mineral oil having a boiling point well above temperatures to be encountered in use. For ordinary usage the amount of plasticizer or oil is about 5 to 40 parts, preferably 10 to 30 parts, by weight per 100 parts by weight of rubbery copolymer. The plasticizer should not boil below 450° F. and preferably should not boil below 550° or 600° F. Of these, those mineral oils having a low aniline point or high aromatic content are much preferred, especially when the rubber contains styrene or has appreciable amounts of aromatic components.

If the pressure sensitivity is not too important, a soft rosin or the like may be employed as the softener, but it is preferable to employ a softener which is liquid at normal temperatures (for example, above about 40° F.). Extremely high volatile, liquid solvents are undesirable.

The volatility of a softener may be determined by placing about 2 cu. in. or so of the liquid in an internally cylindrical cup having an open top with an internal diameter of about one and one-half inches. After the cup is filled to a depth of one-half inch, it is placed in an oven maintained at a temperature of 300° F. After the cup has been in such an atmosphere for four hours, the volatile loss may be measured. A softener suitable for the cement of the present invention should have a volatile loss after four hours of no more than about 25%.

In the cement of the present invention, different types of oily plasticizers or softeners disclosed in said Patent No. 2,964,083 may be used including the following:

Sundex 53, a dark aromatic and naphthenic hydrocarbon lubricating oil extract consisting of around three-fourths aromatic hydrocarbons and around one-fourth naphthenic hydrocarbons.

Circosol 2XH, a product less aromatic than Sundex 53 and comprising hydrocarbons of high molecular weight derived from selected crude petroleum.

Dutrex 6, a product comprising complex high molecular weight aromatic and unsaturated hydrocarbons with no volatile or asphaltic residue.

Dutrex 7, a hydrocarbon plasticizer of the heavy process oil type.

Califlux GP, a product comprising a blend of unsaturated components of naphthenic base petroleum.

Sovaloid N, a dark brown mineral oil containing about 80% of aromatic hydrocarbons.

Sovaloid C, a synthetically produced petroleum oil that is entirely aromatic.

QXS158B and QXS158D and QXS158F, naphthenic light distillates.

QXS158E and QXS158G, refined naphthenic heavy distillates.

In order to obtain a cement layer which after vulcanization will have a modulus so as to stand up in a tire, substantial amounts of HAF type carbon black are added to the cement. Since the cement is to be applied as a layer between the tread and carcass portions of a tire, it has been found that such a high abrasion furnace (HAF) carbon black is necessary whereas semireinforcing carbon black (i.e. SRF carbon black) is unsuitable for this purpose.

As shown in the Vanderbilt Handbook (1958 edition), R. T. Vanderbilt Company, Inc., 230 Park Ave., New York, N.Y., on page 338, the average surface area, in square meters per gram, of HAF carbon black is 74 to 98. Accordingly, the HAF carbon black, suitable for the tread cements and adhesives of the invention, is defined in the claims as "abrasion furnace carbon black" having an average surface area of 74 to 98 square meters per gram. Also, the foregoing inherent chemical and physical properties of the abrasion furnace carbon blacks which are suitable for the purposes of the present invention, for use in tread cements, are hereby expressly incorporated by reference into the specification from the aforesaid Vanderbilt Rubber Handbook.

The abrasion furnace carbon black may, for example, be "Philblack O" (a structure type of fine, high surface area, high abrasion furnace black).

The amount of carbon black used in a cement per 100 parts by weight of rubbery copolymer is about 40 to 90 parts by weight, preferably from 40 or 50 to 70 parts by weight.

Other suitable compounding ingredients may optionally be added to obtain a desirable tire tread cement. Such other ingredients usually have a weight less than about 15% of the weight of the polymer and may include a vulcanizing agent such as sulfur and a suitable accelerator. It may also include an antioxidant, an activator, zinc oxide, and other conventional compounding ingredients. Suitable accelerators include "DPG" (diphenylguanidine), "Santocure" (N-cyclohexyl-2-benzothiazole sulfenamide), "Captax" (2-mercaptobenzothiazole), or "Altax" (benzothiazyl disulphide), and other non-ultra accelerators commonly used in tire compounds. The preferred antioxidant is "BLE" (a high temperature reaction product of diphenylamine and acetone) but various other antioxidants such as "Thermoflax" (di-p-methoxy diphenylamine) or "Tonox" (p,p'-diaminodiphenylmethane) may also be used.

The type of compounding ingredients used in the tire cement may be substantially the same as those employed in the rubber compound to which it is adhered. The accelerator in the cement, for example, may be compatible with the accelerator in the rubber compound to which the cement is applied and should be compatible with the other ingredients of such rubber compound. Conversely, the accelerator in the rubber compound should be compatible with the ingredients of the cement.

The compounding ingredients employed in the cement are selected so that the cement will be vulcanized at the proper temperature and at the proper rate when the tire is vulcanized. Excellent results are obtained when the rate of cure of the cement is substantially the same as the rate of cure of the rubber compound to which it is applied. The cement and rubber compounds in the tire should have a moderate rate of cure. For example, the compounds should require at least about 20 minutes to cure at 280° F. The temperature at which the compounds are cured may be from about 260° to 360° F. but is preferably between about 280° and 340° F. By varying the vulcanization temperature, the rate of cure of the compounds may be varied from about 60 minutes to less than two minutes.

In order to obtain a vulcanizable tire tread cement compound, it is necessary to employ a high-Mooney polymer. The computed Mooney plasticity of the raw polymer is at least about 120. While rubbers with a computed Mooney plasticity of considerably greater than 250 might be used in the cements, the rubbers usually have a Mooney plasticity no greater than about 250 and preferably have a Mooney plasticity of no more than about 200. We have found that the rubbers preferred for the cement of the present invention have a computed Mooney plasticity of about 120 up to 150 or 200, and preferably about 120 to 150.

One of the main steps in making the rubber cement of the present invention is mixing a high-Mooney rubber polymerization product of a conjugated diolefinic compound of not more than 8 aliphatic carbon atoms with a suitable resinous material, such as "Koresin," "Cumar MH" or the like, which is compatible with such polymerization product. Various high-Mooney polymers may be used, but non-oil-resistant copolymers of a butadiene and a styrene copolymerizable therewith appear to be the most important of these commercially. Such copolymers may be highly compatible with hydrocarbon mineral oils. In order to obtain a cement having the high quality necessary for a satisfactory tire cement, about 30 to 60 parts by weight of a compatible resinous material should be added to every 100 parts by weight of the polymer.

As above pointed out, such resinous material should be compatible with the polymer and may be one of several compatible curable tackifying resins which have a substituted ring structure and are soluble in pure benzene, as described above.

The addition of 20 to 80 parts of resin to a high-Mooney synthetic rubbery polymer provides a mixture which has more plasticity and more tackiness than the raw polymer.

We have also found that excellent tires can be made which contain 150 or even as much as 200 parts of natural rubber per 100 parts by weight of high-Mooney oil-extended rubber. If a rubber compound does not contain more oil than can be absorbed by the high-Mooney rubber in the compound, natural rubber can be added to the compound in almost any amount without ill effects due to the oil. However, the natural rubber is not always needed, and, as mentioned before, if added at all, the amount of natural rubber comprises not more than about ⅓ to ⅔ the amount of high Mooney synthetic rubber.

It has also been discovered that by preparing a cement with a very high Mooney polymer with a large capacity for absorbing oil and with a small amount of oil substantially less than the amount which can be absorbed by said polymer, it may be possible to obtain a good cement for oil-extended rubber which contains 100 or even 150 parts of natural rubber per 100 parts of said polymer provided that such polymer can absorb substantially all of the oily plasticizer which migrates from the oil-extended rubber compound to which the cement is applied. However, the better cements of the present invention contain less than 60, preferably less than 30, parts of natural rubber per 100 parts of high-Mooney polymer. When natural rubber is employed, it is often preferable to use no more than about 10 or 20 parts of natural rubber per 100 parts of high-Mooney polymer since larger amounts of natural rubber are not ordinarily needed to obtain the desired pressure sensitivity.

At least about 5 parts of a softener that is highly compatible with the polymer and the resinous material may be added to the cement compound to reduce the amount of pressure required to make the compound adhere to another piece of rubber. As pointed out above, various softeners or plasticizers may be used, but for use in the building of the highest quality tires the softener is preferably an oily plasticizer or a softener that is liquid at normal temperatures between about 40° F. and 500° F. The softener may, for example, be wholly or partly an oily material containing large amounts of coal tar oils or the like, but hydrocarbon mineral oils, such as "Sundex 53" or the like, are preferred. Liquid polybutadiene having a molecular weight of about 1500 to 8000 may also be used as the softener.

Where the polymer has a computed Mooney viscosity of about 120 to 150, 100 parts by weight of the polymer preferably contains about 30 to 50 parts by weight of resin and about 10 to 20 parts by weight of liquid softener. Where the polymer has a computed Mooney viscosity of about 150 to 200, the cement compound preferably contains about 40 to 60 parts by weight of resin and about 20 to 40 parts by weight of liquid softener per 100 parts by weight of polymer. The ranges indicated in this paragraph as being preferred would usually be preferable in the commercial manufacture of the cement; but, since the film strength can be increased by the use of natural rubber, the amount of liquid softener may be reduced somewhat by adding natural rubber in addition to the softener. However, it is usually preferable to employ at least about 5 parts of oily softener even where substantial amounts of natural rubber are added to the high-Mooney cement. Where the computed Mooney of the raw polymer is below about 200, the total amount of softener and natural rubber preferably does not exceed 60 parts. The amount of softener for best results depends upon the percentage of resin and the type of polymer in the cement and is selected to provide a cement which has a satisfactory film strength.

Excellent adhesion may be obtained between a rubber tread or carcass composition of the type described above and the rubber cement composition of the present invention, particularly where the polymer used in the cement composition is the same as the polymer used in the rubber composition of the portion of the tire to which the cement is applied. It has been found that an excellent high-Mooney oil-extended rubber tire may be made where the compounding ingredients (vulcanizing agent, accelerator, antioxidant, activator, etc.) used in the cement are not greatly different from those employed in the rubber compound to which the cement is applied. In such a tire the modulus and other physical properties of the cement and the rubber compound may be substantially the same after vulvanization, and the rate of cure of the cement during vulcanization may be substantially the same as that of the rubber compound.

Examples are given below to show how the cement of the present invention may be employed in the making of synthetic rubber pneumatic tires. It will be understood that the various rubber compounds and cement compounds described in the examples may be prepared using standard latex mixing procedures or standard milling procedures. Mixing of the compounds may be accomplished, for example, using the methods described in said Patent No. 2,964,083. The carcass compounds are applied by calendering to a suitable tire fabric and such fabric is used in the conventional manner to form the plies of a tire carcass. The tread compounds are likewise used in a conventional manner to form the tread portion of the tire. The carcass cements are applied to the plies of the tire and the tread cements are applied to the tread splice and between the carcass and tread portions of the tire in the conventional manner as the tire is being built on a drum according to the flat-band process and before vulcanization of the tire.

EXAMPLE I

An oil-extended rubber tread compound is prepared from a substantially gel-free, butadiene-styrene copolymer polymerized at 41° Fahrenheit and containing 72 percent by weight of butadiene and 28 percent by weight of styrene and having a Mooney viscosity (ML-4) of 150 using the following recipe:

*Oil-extended GR-S tread recipe*

| | Parts |
|---|---|
| 150 ML-4 polymer (GR-S cold rubber) | 100 |
| Petroleum softener (Sundex 53) | 50 |
| HAF carbon black (Philblack O) | 75 |
| Zinc oxide | 5 |
| Stearic acid | 2 |
| Sulfur | 2.2 |
| Santocure | 1.2 |
| DPG | 0.2 |

The above materials are compounded and mixed under the usual two-pass Banbury mixing procedure and extruded into a suitable form.

A tread cement compound of this invention is prepared from the same copolymer using the following recipe:

*GR-S tread cement compound recipe*

| | Parts |
|---|---|
| 150 ML-4 polymer (GR-S cold rubber) | 100 |
| Koresin | 40 |
| Petroleum softener (Sundex 53) | 10 |
| HAF carbon black (Philblack O) | 60 |
| Zinc oxide | 5 |
| Sulfur | 2.2 |
| BLE | 1.0 |
| Santocure | 1.2 |
| DPG | 0.3 |

One hundred parts of the above cement compound is dissolved, after the usual appropriate mixing on a mill, in 900 parts of petroleum naphtha or gasoline to form a cement solution.

The same polymer is also used to prepare a carcass compound using the following recipe:

*Oil-extended GR-S carcass recipe*

| | Parts |
|---|---|
| 150 ML-4 polymer (GR-S cold rubber) | 100 |
| Petroleum softener (Sundex 53) | 50 |
| FEF carbon black (Philblack A) | 65 |
| Zinc oxide | 5 |
| Stearic acid | 2 |
| Sulfur | 2.2 |
| Santocure | 1.2 |
| DPG | 0.2 |

After the cement and rubber compounds have been mixed, they are used in the conventional manner to build a tire, the carcass compound being calendered on to a tire cord fabric (which has previously been treated or dipped as in Mighten Patent No. 2,561,215 with a compounded vinyl pyridine-butadiene copolymer (latex) to form reinforced rubber ply material, and the tread compound being mixed in the regular way and extended to the shape of the tread portion of the tire.

The ply fabric is coated on both sides with the above cement solution by suitable means and is cut on the bias for use in forming tire plies. These plies are used in the customary way to form a tire carcass on the drum of a tire-building machine. The tread cement is then applied at the splice and to the bottom of the extruded tread stock, and after drying the thus coated tread is applied to said carcass. The dried cement (adhesive) forms a thin layer at the splice and between the tread and carcass portions of the tire. The tire is then shaped and vulcanized in the usual manner in a suitable mold.

A tire produced in this way is very durable and will last for a long period of time without separation of the tread from the carcass. Such a tire having the oil-extended tread adhered at the splice and to the carcass as above will last more than 30,000 miles under severe conditions of use (e.g. at 75 miles per hour) without failure.

EXAMPLE II

A standard GR-S cold rubber tread compound is prepared from a substantially gel-free, butadiene-styrene copolymer polymerized at 41° F. and containing 72 percent by weight of butadiene and 28 percent by weight of styrene and having a Mooney viscosity (ML-4) of 50 using the following recipe:

*Regular GR-S tread recipe*

| | Parts |
|---|---|
| 50 ML-4 polymer (GR-S cold rubber) | 100 |
| HAF carbon black (Philblack O) | 50 |
| Petroleum softener (Sundex 53) | 8 |
| Zinc oxide | 3 |
| Stearic acid | 1 |
| Sulfur | 1.75 |
| Santocure | 1 |

The above materials are compounded and mixed on a Banbury mixer according to the usual mixing procedure and are extruded into a suitable form.

The same GR-S copolymer (50 ML-4) is used to prepare a rubber carcass compound using the following recipe:

*GR-S carcass recipe*

| | Parts |
|---|---|
| 50 ML-4 polymer (GR-S cold rubber) | 100 |
| FEF carbon black (Philblack A) | 40 |
| Zinc oxide | 5 |
| Stearic acid | 1 |
| Petroleum softener (Sundex 53) | 12 |
| Sulfur | 1.8 |
| Altax | 1.5 |
| DPG | 0.2 |

The above materials are compounded and mixed in the usual manner and are calendered onto a tread tire cord fabric in the manner described in Example I to form fabric-reinforced rubber ply material.

A similar substantially gel-free, butadiene-styrene copolymer polymerized at 41° F. and containing 72% butadiene and 28% styrene and having a Mooney viscosity of 150 ML-4 is used to prepare a carcass cement compound according to the following recipe:

*GR–S carcass cement recipe*

| | Parts |
|---|---|
| 150 ML-4 polymer (GR–S cold rubber) | 100 |
| Koresin | 40 |
| Petroleum softener (Sundex 53) | 15 |
| FEF carbon black (Philblack A) | 50–60 |
| Zinc oxide | 5 |
| Santocure | 1.2 |
| Sulfur | 2.5 |
| DPG | 0.3 |

After the usual appropriate mixing on a mill 100 parts of the above cement compounds are dissolved in 900 parts of petroleum naphtha or gasoline to form a cement solution which may readily be applied to reinforced ply material.

A tread cement compound of this invention is prepared from a similar substantially gell-free, butadiene-styrene copolymer polymerized at 41° F. and containing 72% butadiene and 28% styrene and having a Mooney viscosity (ML-4) of 145 using the following recipe:

*GR–S tread cement recipe*

| | Parts |
|---|---|
| 145 ML-4 polymer (GR–S cold rubber) | 100 |
| Koresin | 40 |
| HAF carbon black (Philblack O) | 60 |
| Zinc oxide | 5 |
| Sundex 53 | 10 |
| BLE | 1 |
| Sulfur | 2.2 |
| Santocure | 1.2 |
| DPG | 0.3 |

After appropriate mixing 100 parts of the above tread cement compound is dissolved in 900 parts of petroleum naphtha or gasoline to form a cement solution which may readily be applied to the tread portion of the tire.

Said tread cement solution is applied in any suitable manner to both sides of the ply fabric made from the carcass compound of this example, and such ply fabric is cut on the bias and is used in the customary manner to form tire plies. These plies, which are coated on both sides with the above carcass cement, are used in the customary way to form a tire carcass on the drum of a tire-building machine. The extruded tread stock is cut on the bias to the proper length for application to the carcass and the tread cement of this example is applied at the tread splice and to the bottom of the tread stock. After drying, the thus coated tread stock is applied to the carcass in the conventional manner. The tire is then inflated to a suitable toroidal form in a vulcanizing mold and cured in the conventional manner.

An all-synthetic tire produced in the manner described in this Example II does not show any substantial tread or ply separation after being operated for 30,000 miles or so. Tests show that low Mooney all-synthetic GR–S rubber tires made with the GR–S cement of the present invention have improved properties, and GR–S rubber tires made with such cement appear to be even better than GR–S rubber tires made with the best natural rubber cements.

EXAMPLE III

The tread cement compound of Example II, instead of being dissolved to form a cement solution, is employed like a conventional rubber compound to form test samples which are vulcanized or cured at 287° F. for periods of 45 minutes and 60 minutes, respectively. The physical properties of the vulcanized samples were as follows:

| | Cure 45′ | Cure 60′ |
|---|---|---|
| 300% Modulus (p.s.i.) | 1,470 | 1,675 |
| Tensile Strength (p.s.i.) | 3,540 | 3,480 |
| Elongation (maximum) (percent) | 580 | 510 |
| Tear Strength (lbs./in.) | 380 | 346 |
| Hardness (Shore Durometer) | 70 | 72 |

EXAMPLE IV

An oil-extended rubber tread compound is prepared from a substantially gel-free, butadiene-styrene copolymer polymerized at 41° F. and containing 72 percent by weight of butadiene and 28 percent by weight of styrene and having a Mooney viscosity (ML-4) of 150 using the following recipe:

*Oil-extended GR–S tread recipe*

| | Parts |
|---|---|
| 150 ML-4 polymer (GR–S cold rubber) | 100 |
| Petroleum softener (Sundex 53) | 50 |
| HAF carbon black (Philblack O) | 75 |
| Zinc oxide | 5 |
| Stearic acid | 2 |
| Sulfur | 1.2 |
| DPG (diphenyl guanidine) | 0.2 |

The above materials are compounded and mixed under the usual two-pass Banbury mixing procedure and extruded into a suitable form.

A tread cement compound of this invention is prepared from the same copolymer using the following recipe:

*GR–S tread cement recipe*

| | Parts |
|---|---|
| 150 ML-4 polymer (GR–S cold rubber) | 100 |
| Resin (Koresin or natural wood rosin) | 40 |
| HAF carbon black (Philblack O) | 60 |
| Natural rubber | 10 |
| Petroleum softener (Sundex 53) | 10 |
| Zinc oxide | 5 |
| Vulcanizing agent (sulfur) | 2.2 |
| Antioxidant (BLE) | 1.0 |
| Accelerator (Santocure) | 1.2 |
| Accelerator (diphenyl guanidine) | 0.3 |

One hundred parts of the above cement compound is dissolved, after the usual appropriate mixing on a mill, in 900 parts of petroleum naphtha or gasoline to form a cement solution.

The same polymer is also used to prepare a carcass compound using the following recipe:

*Oil extended GR–S carcass recipe*

| | Parts |
|---|---|
| 150 ML-4 polymer (GR–S cold rubber | 100 |
| FEF carbon black (Philblack A) | 65 |
| Petroleum softener (Sundex 53) | 50 |
| Zinc oxide | 5 |
| Stearic acid | 2 |
| Vulcanizing agent (sulfur) | 2.2 |
| Accelerator (Santocure) | 1.2 |
| Accelerator (diphenyl guanidine) | 0.2 |

After the cement and rubber compounds of this Example IV have been mixed, they are used in the conventional manner to build a tire in the manner described in Example I. The resulting tire performs as well as the high-Mooney oil-extended rubber tire of Example I and lasts more than 30,000 miles under severe conditions of use without failure due to tread or ply separation.

As compared with the uncured tread cement compound of Example I, the cement compound of Example IV provides a cement film having more surface tack or pressure sensitivity and almost as much film strength. Substantial amounts of natural rubber can be added to the cement to increase the pressure sensitivity thereof without seriously reducing the film strength of the cement even where the cement also contains substantial amounts of hydrocarbon mineral oils or other oily plasticizers. By the use of natural rubber to obtain pressure sensitivity or surface tack, the amount of oily softener or plasticizer required in the cement may be reduced substantially or substantially eliminated, particularly where the synthetic polymer has a raw computed Mooney plasticity of about 90 or less. However, the amount of oily plasticizer used in the cement is usually preferably above about 5 parts per hundred parts of high-Mooney polymer.

In the above examples, Koresin is indicated by way of example as one of the tackifying resins which may be used, but similar results may be obtained using the same amount by weight of any of the other resins mentioned hereinabove as being suitable as the main tackifier of the cement. Wherever the amount of resins to be added to the cement is specified as being within a certain range, it will be understood that the total amount of all the resins in the cement is preferably within that range regardless of the type of resin employed. Thus, a cement which contains 30 to 80 parts of Koresin or other compatible tackifying resins per 100 parts of polymer does not contain in addition to said 80 parts substantial amounts of other resins, such as those which are not tackifiers or which are not compatible with the rubber. Also a cement compound which contains up to 30 parts of a specified softener or plasticizer per 100 parts of polymer preferably does not contain in addition some other plasticizer which would substantially change the physical properties of the compound. However, it will be understood that various amounts of natural rubber may be mixed with the cement if the total amount of such natural rubber is not specified, and that many of the advantages of the present invention may be obtained using amounts of resin, plasticizer and other ingredients in the cement which vary somewhat from the preferred amounts.

In the above examples, the essential constituents of each of the rubber compounds and the amounts of each are specified and no substantial amount of other ingredients are employed in addition to those specifically mentioned; but it will be understood that the tread, carcass and cement compounds described in the above examples are merely exemplary and that the amounts of the various compounding ingredients may be varied considerably to obtain the various properties which may be desired.

The terms "polymer" and "polymerization product" are used herein in the broad generic sense so as to include copolymers as well as homopolymers.

The expression "fine high-abrasion reinforcing carbon black" is used in the claims to identify carbon blacks, such as high-abrasion furnace (HAF) carbon black, which provide a high degree of reinforcement and excludes carbon blacks, such as semi-reinforcing carbon blacks, which provide little reinforcement.

It is understood that, in accordance with the provisions of the patent statutes, variations and modifications of the articles, compounds and methods disclosed herein may be made without departing from the spirit of the invention.

Having described our invention, we claim:

1. A tread adhesive composition for synthetic rubber tires which comprises 100 parts by weight of a rubbery hydrocarbon polymerization product of at least a major proportion of a conjugated diolefinic compound of not in excess of 8 carbon atoms, said polymerization product having a raw computed Mooney viscosity of about 120 to 200, about 40 to 90 parts by weight of high abrasion furnace carbon black having an average surface area of at least about 74 to 98 square meters per gram, up to 40 parts by weight of an added compatible liquid hydrocarbon plasticizer oil, and at least about 20 to 80 parts by weight of a compatible tackifying resinous material which is soluble in benzene and is selected from the group consisting of condensation products of acetylene and at least one phenol which consists only of carbon, oxygen and hydrogen atoms and which is open in more than one of the ortho and para positions; condensation products of an aliphatic aldehyde having no more than two carbon atoms and at least one phenol which consists only of carbon, oxygen and hydrogen atoms and which is open in more than one of the ortho and para positions; rosins; indene resins; coumarone resins; and mixtures thereof.

2. A tread adhesive composition in accordance with claim 1 wherein the amount by weight of resinous material is at least twice the amount of plasticizer oil and the total amount of plasticizer oil and any other plasticizers does not exceed about 50 parts by weight.

3. A tread adhesive composition in accordance with claim 2 wherein said plasticizer oil is present in an amount equal to at least about 5 parts by weight per 100 parts of said polymerization product, is liquid at 40° F. and has a volatility such that when placed in an open cup for four hours in an atmosphere maintained at a temperature of 300° F. the volatile loss will not be substantially greater than 25 percent.

4. A tread adhesive composition in accordance with claim 3 wherein said polymerization product has a raw computed Mooney viscosity of about 120 to 150 and said composition contains from 10 to 20 parts by weight of said plasticizer oil and 30 to 50 parts by weight of said resinous material.

5. A tread adhesive composition in accordance with claim 3 wherein said polymerization product has a raw computed Mooney viscosity of about 150 to 200 and said composition contains from 20 to 40 parts by weight of said plasticizer oil and 40 to 60 parts by weight of said resinous material.

6. A tread adhesive composition in accordance with claim 3 wherein when said composition is applied to a synthetic rubber tire tread and allowed to be substantially dried, said composition is vulcanizable at substantially the same rate as said tire tread when said tire tread is bonded to a tire carcass.

7. A tread adhesive composition in accordance with claim 3 wherein the major proportion of said resinous material is a condensation product of an acetylene and a phenol which consists of carbon, oxygen and hydrogen atoms and which is open in both ortho positions, the para position of said phenol containing an alkyl group of from 3 to 6 carbon atoms.

8. A tread adhesive composition in accordance with claim 7 wherein said alkyl group on said phenol is a tertiary alkyl group and said polymerization product is substantially gel-free.

9. A vulcanized synthetic rubber tire, said tire when unvulcanized having uncured portions joined by a thin layer of a vulcanizable, self-adhering rubber cement compound of high film strength interposed between said portions, said cement compound comprising 100 parts by weight of a rubbery synthetic hydrocarbon polymerization product of a conjugated diolefinic compound of not in excess of eight carbon atoms having a raw computed Mooney viscosity of 120 to 150, said polymerization product being the copolymer of said conjugated diolefinic compound and a copolymerizable monoolefinic compound, the atoms forming said polymerization product being obtained principally from said conjugated diolefinic compound, about 40 to 90 parts by weight of high abrasion furnace carbon black having an average surface area of at least about 74 to 98 square meters per gram, about 10 to 20 parts by weight of a compatible hydrocarbon oil, said oil being liquid at normal temperatures and having a volatility such that when placed in an open cup for a few hours in an atmosphere maintained at a temperature of 300° F. the volatile loss will be not substantially greater than about 25 percent, and about 30 to 50 parts by weight of a compatible tackifying resinous material that is soluble in pure benzene, the amount by weight of resinous material being at least twice the amount of oil, said resinous material being selected from one group consisting of a condensation product of acetylene and at least one phenol which consists only of carbon, oxygen and hydrogen atoms and which is open in more than one of the ortho and para positions; condensation products of an aliphatic aldehyde having no more than two carbon atoms and at least one phenol which consists only of carbon, oxygen and hydrogen atoms and which is open in more than one of the ortho and para positions; rosins; indene resins; coumarone resins; and mixtures thereof, the total amount of oil and any other plasticizers in said cement compound not exceeding about 50 parts by weight.

10. A vulcanized synthetic rubber tire, said tire when unvulcanized having uncured portions joined by a thin layer of a vulcanizable, self-adhering rubber cement compound of high film strength interposed between said portions, said cement compound comprising 100 parts by weight of a rubbery synthetic hydrocarbon polymerization product of a conjugated diolefinic compound of not in excess of eight carbon atoms having a raw computed Mooney viscosity of 150 to 200, said polymerization product being the copolymer of said conjugated diolefinic compound and a copolymerizable monoolefinic compound, the atoms forming said polymerization product being obtained principally from said conjugated diolefinic compound, about 40 to 90 parts by weight of high abrasion furnace carbon black having an average surface area of at least about 74 to 98 square meters per gram, about 20 to 40 parts by weight of a compatible hydrocarbon oil, said oil being liquid at normal temperatures and having a volatility such that when placed in an open cup for a few hours in an atmosphere maintained at a temperature of 300° F. the volatile loss will be not substantially greater than about 25 percent, and about 40 to 60 parts by weight of a compatible tackifying resinous material that is soluble in pure benzene, the amount by weight of said resinous material being at least twice the amount of oil, said resinous material being selected from the group consisting of a condensation product of acetylene and at least one phenol which consists only of carbon, oxygen and hydrogen atoms and which is open in more than one of the ortho and para positions; condensation products of an aliphatic aldehyde having no more than two carbon atoms and at least one phenol which consists only of carbon, oxygen and hydrogen atoms and which is open in more than one of the ortho and para positions; rosins; indene resins; coumarone resins; and mixtures thereof, the total amount of oil and any other plasticizers in said cement compound not exceeding about 50 parts by weight.

11. A vulcanized pneumatic rubber tire, said tire when unvulcanized having uncured rubber portions joined by a thin layer of a vulcanizable rubber cement compound interposed between said rubber portions, said cement compound comprising 100 parts by weight of a rubbery hydrocarbon copolymer of butadiene-1,3 and styrene which contains at least 50 percent by weight of said diene and have a raw computed Mooney viscosity of about 120 to 250, about 40 to 90 parts by weight of high abrasion furnace carbon black having an average surface area of at least about 74 to 98 square meters per gram, about 10 to 40 parts by weight of a compatible hydrocarbon oil that remains liquid at temperatures from about 40 to 500° F., and about 30 to 60 parts by weight of a compatible oil-soluble resinous tackifying material, and at least 5 parts of other ingredients including a vulcanizing agent, an accelerator, and an antioxidant, said resinous material consisting essentially of at least one oil-soluble resinous condensation product of acetylene and a phenol substituted in one of the ortho and para positions with a hydrocarbon group having at least three carbon atoms of aliphatic substitution.

12. A vulcanized synthetic rubber tire, said tire when unvulcanized having uncured portions joined by a thin layer of a vulcanizable rubber cement compound interposed between said rubber portions, said cement compound comprising 100 parts by weight of at least a major proportion of a conjugated diolefinic compound of not in excess of 8 carbon atoms, said polymerization product having a raw computed Mooney viscosity of about 120 to 200, about 40 to 90 parts by weight of high abrasion furnace carbon black having an average surface area of at least about 74 to 98 square meters per gram, up to 40 parts by weight of an added compatible liquid hydrocarbon plasticizer oil, and at least about 20 to 80 parts by weight of a compatible resinous tackifying material selected from the group consisting of a condensation product of acetylene and at least one phenol which consists only of carbon, oxygen and hydrogen atoms and which is open in more than one of the ortho and para positions; condensation products of an aliphatic aldehyde having no more than two carbon atoms and at least one phenol which consists only of carbon, oxygen and hydrogen atoms and which is open in more than one of the ortho and para positions; rosins; indene resins; coumarone resins; and mixtures thereof.

13. A tire in accordance with claim 12 wherein in said cement compound the amount by weight of resinous material is at least twice the amount of plasticizer oil and the total amount of plasticizer oil and any other plasticizers does not exceed about 50 parts by weight.

14. A tire in accordance with claim 13 wherein in said cement compound said plasticizer oil is present in an amount equal to at least about 5 parts by weight per 100 parts of said polymerization product, is liquid at 40° F. and has a volatility such that when placed in an open cup for four hours in an atmosphere maintained at a temperature of 300° F. the volatile loss will not be substantially greater than 25 percent.

References Cited

UNITED STATES PATENTS

| | | | |
|---|---|---|---|
| 2,576,968 | 12/1951 | Pike et al. | 260—33.6 |
| 2,742,942 | 4/1956 | Owen | 152—330 |
| 2,749,960 | 6/1956 | Schwartz | 152—330 |

FOREIGN PATENTS

| | | |
|---|---|---|
| 152,872 | 8/1953 | Australia. |

MURRAY TILLMAN, *Primary Examiner.*

WILLIAM H. SHORT, *Examiner.*

J. W. SANNER, G. F. LESMES, *Assistant Examiners.*